Aug. 4, 1936. F. WINKLER 2,049,880
ROLLER CLUTCH FOR FREEWHEEL CYCLE HUBS
Filed June 1, 1935

Inventor
Franz Winkler

Patented Aug. 4, 1936

2,049,880

UNITED STATES PATENT OFFICE 2,049,880

ROLLER CLUTCH FOR FREEWHEEL CYCLE HUBS

Franz Winkler, Schweinfurt, Germany

Application June 1, 1935, Serial No. 24,490
In Germany June 7, 1934

6 Claims. (Cl. 192—6)

The invention relates to a roller clutch for free wheel cycle hubs of that type in which friction rollers are located in recesses of the circumference of a rotatable member and controlled by a guide ring in such a manner that with the forward rotation of the rotatable member they are pressed against the inner face of the hub shell, thus coupling same to the rotatable member, while on backward rotation the clutch rollers are moved away from the hub shell by their guide ring and carried to the deeper points of the receiving recesses.

The object of the invention is during free wheeling and back pedalling to immobilze said clutch rollers in their inoperative position in which they are placed at the deeper points of the recesses having eccentrical bottom faces on which the rollers ride to and fro in the circumferential direction of the supporting rotatable member which is generally the driving member of a free wheel hub for bicycles.

A further object of the invention is positively to secure disconnection of the clutch when its normal operation is troubled by accidental influences, such as dust or thickened oil.

These objects are attained by combining the usual guide ring of the clutch rollers with an additional envelope or external ring adapted to project more or less over the perforations of the guide ring in which the rollers are spaced apart and retained. For this purpose the said external ring which is provided with similar perforations is movable relatively to the guide ring and preferably circumferentially thereto, while this rocking movement is caused by a positive connection of the external ring with the driving member so that when the rollers are at the deeper points of the recesses the external ring projects over the perforations of the guide ring thus withholding the rollers from contact with the hub shell.

In the annexed drawing, which forms a part of this specification, a constructional embodiment of the invention is represented by way of example. In this drawing—

Figure 1:
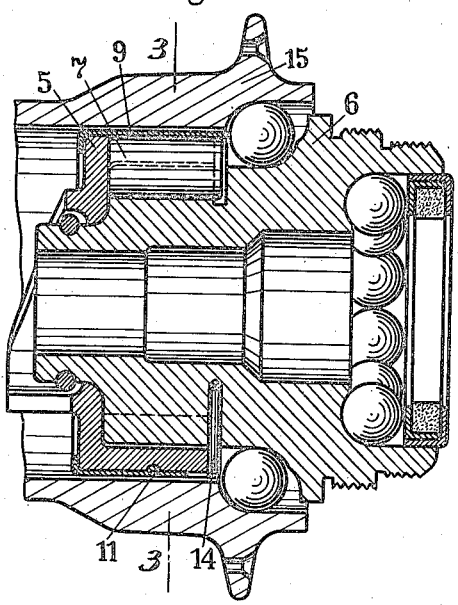
Fig. 1 is a partial sectional view on the line 1—1 of Fig. 3 of parts of a free wheel hub provided with the safety device according to the invention.

A roller clutch is disposed on the periphery of the driving body 6 of a free-wheel coaster hub of a well-known type, and is constituted by the rollers 7 which are movable within recesses of the driving body in peripheral direction and held within perforations 8 of a guide ring 5 revoluble on the driver and secured against axial shifting. The perforations 8 in part encircle the said rollers from the outside so that the latter are prevented from dropping out but a small free play is still left so that the rollers 7 are susceptible of being pressed against the internal surface of the hub sleeve 15 in their coupling position, in which case they are moved outwards, rolling upon the eccentric bottom faces $6^b$ of the recesses $6^a$ formed in the driving body 6.

The device intended for disengagement and immobilizing the rollers 7 consists in a locking or auxiliary ring 9 which is mounted on the periphery of the roller guide ring 5 with a small play and likewise provided with perforations 10 for the rollers 7 in front of the perforations 8. It is secured against axial displacement on the guide ring by guide means, such as pop marks 11 applied to its periphery and adapted to engage with a peripheral groove 12 of the roller guide ring. Further, the auxiliary or locking ring 9 is provided in suitable places, e. g. at its edge with notches 13 into which extend pins 14 secured to the driving body so that when the roller guide ring is angularly displaced relatively to this driver, also the perforations 8 are angularly displaced relatively to the perforations 10 and the auxiliary ring 9 is caused to partly overlap the perforations 8.

This safety device works as follows: When the pedals and consequently the driver 6 are rotated forwardly the lock ring 9 is taken along by the pins 14 whereas the roller guide ring 5 is retained by a known friction spring such as the spring o in the United States patent to Ernst Sachs No. 960,710, issued June 7, 1910, and the rollers are caused to rise on the eccentrical paths $6^b$ until they partly project through the perforations 8 and 10 fully opened, so as to bear against the internal surface of the hub sleeve 15, thereby coupling the said sleeve to the driver 6.

Figure 3:
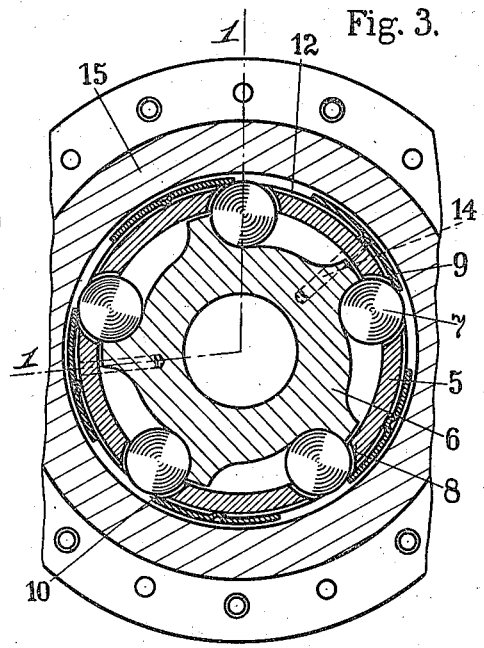
Figs. 3 and 4 illustrate cross-sections on the line 3—3 of Fig. 1 showing the roller clutch in its inoperative and operative positions, respectively.
Figure 2:
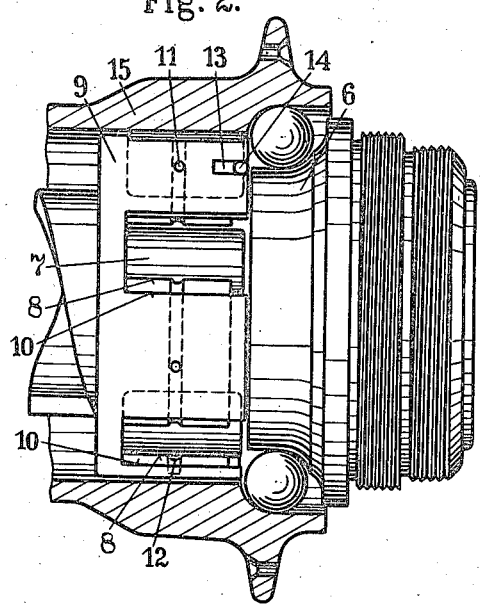
Fig. 2 represents an axial sectional view of the hub shell and a side elevation of parts enclosed therein.
Figure 4:
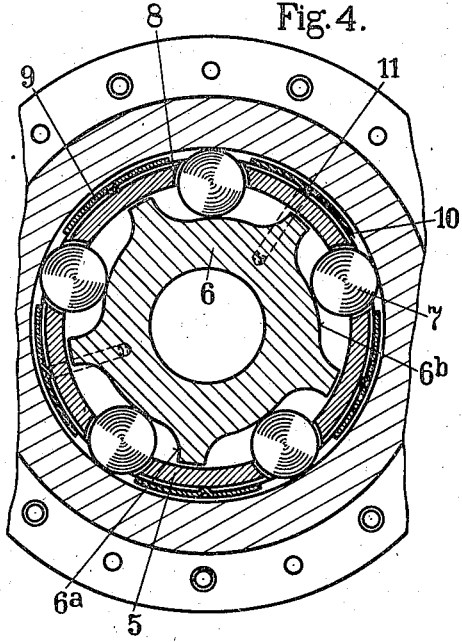

When the cyclist wants to get down he stops actuating the pedals and then actuates them backwards but without operating the brake. By turning the driver backwards the external ring 9 is turned in the same direction and caused to overlap the perforations 8 of the roller guide ring 5 which is then immobilized by the friction spring. In this manner the external ring 9 encircles the rollers or clutch members 7 now positioned in the deeper portions of the recesses 6ª and keeps them away from the hub sleeve as shown in Fig. 3. The bicycle can then be moved forward and backward without hindrance while the pedals do not move. When the cyclist has neglected to pedal backwards prior to descending it will suffice to subsequently apply a slight pressure to the pedal directed towards the rear end of the bicycle, which operation also results in the safety means being made operative and the rollers being withdrawn from the hub sleeve. The device intended for disengaging the friction roller clutch works positively and therefore fulfils its task in a reliable manner.

What is claimed as new, is—

1. In a device of the kind described, a roller clutch, composed of a rotatable supporting and driving body having recesses in its periphery, rollers circumferentially movably received therein, and a guide ring encircling the said supporting body and retaining the said rollers in its perforations, in combination with an external additional safety ring relatively rotatable on the guide ring, positively interconnected with the driving body and adapted to overlap the perforations of the guide ring.

2. In a friction clutch for bicycle hubs, the combination with a driving body having eccentric depressions in its periphery, of friction rollers received in said depressions, a guide ring encircling said driving body, perforations in the guide ring being adapted to space and retain the friction rollers, a safety ring encircling the guide ring and capable of partially closing the outer ends of the perforations of the guide ring, positive means interconnecting the said safety ring with the driving body, and a sleeve-like casing containing the clutch and adapted to be engaged by the rollers.

3. In a bicycle hub of the kind described, the combination with a supporting member recessed in its periphery, of clutch rollers located on the supporting member, a perforated guide ring adapted to receive the rollers, a safety ring rotatable relatively to the guide ring and capable of retaining the clutch rollers in the guide ring, a sleeve-like member encircling the whole clutch, and means for positively interconnecting the safety ring with the supporting member.

4. In a bicycle free wheel hub of the kind described, a roller friction clutch having coupling rollers placed in peripheral recesses of a driving body, in combination with a guide ring for the rollers and a locking ring relatively rotatably mounted on the guide ring and positively connected to the driving body, perforations of the guide ring and of the locking ring being adapted to relatively overlap so as to check the rollers interiorly of the guide ring.

5. In a bicycle free wheel hub of the kind described, the combination of a driving body, eccentric clutch faces being provided thereon, of clutch rollers circumferentially movable on said faces, a guide ring receiving the rollers in perforations made in it and having a circumferential groove, a lock ring encircling the guide ring and rotatable relatively thereto and adapted to overlap the perforations of the guide ring, projections of the lock ring engaging the circumferential groove of the guide ring, and means capable of positively interconnecting the locking ring and the driving body.

6. In a bicycle free wheel hub of the kind described, the combination with a driving body, of clutch rollers mounted thereon, a guide ring receiving the rollers in perforations, a locking ring encircling said guide ring having similar perforations and adapted to overlap the perforations of said guide ring and partially close said latter perforations, and projections of the driving body engaging notches of the locking ring.

FRANZ WINKLER.